(12) United States Patent
Brown et al.

(10) Patent No.: US 8,511,739 B2
(45) Date of Patent: *Aug. 20, 2013

(54) CONTROL SYSTEM FOR USE WITH A DUAL HINGED VEHICLE DOOR

(75) Inventors: Matthew Lee Brown, Redondo Beach, CA (US); Franz von Holzhausen, Malibu, CA (US); Peter Dore Rawlinson, Evesham (GB); Nicholas John Sampson, Rolling Hills Estates, CA (US); Michael James Eckert, Hermosa Beach, CA (US); David Lemire, Redondo Beach, CA (US); Axel Boris Vollmer, Marina Del Rey, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,577

(22) Filed: Sep. 14, 2012

(65) Prior Publication Data

US 2013/0099524 A1    Apr. 25, 2013

Related U.S. Application Data

(63) Continuation of application No. 13/615,742, filed on Sep. 14, 2012.

(60) Provisional application No. 61/549,019, filed on Oct. 19, 2011, provisional application No. 61/564,405, filed on Nov. 29, 2011, provisional application No. 61/594,971, filed on Feb. 3, 2012.

(51) Int. Cl.
*B60J 5/10* (2006.01)
(52) U.S. Cl.
USPC ............... 296/146.12; 296/146.4; 296/146.13

(58) Field of Classification Search
USPC ............... 296/146.12, 146.8, 146.11, 146.13, 296/56, 76, 202; 49/197, 381, 386, 387, 49/502
See application file for complete search history.

(56) References Cited

U.S. PATENT DOCUMENTS

| 6,068,327 | A  | * | 5/2000 | Junginger | 296/146.13 |
| 6,418,667 | B1 | * | 7/2002 | Moon | 49/340 |
| 6,454,341 | B2 | * | 9/2002 | Tolinski | 296/106 |
| 6,676,190 | B2 | * | 1/2004 | Daniels et al. | 296/106 |

* cited by examiner

*Primary Examiner* — Joseph Pape
*Assistant Examiner* — Dana Ivey
(74) *Attorney, Agent, or Firm* — Patent Law Office of David G. Beck

(57) ABSTRACT

A control system for use with a vehicle's dual hinged door assembly is provided, the control system including a door switch, upper and lower door portions, primary and secondary door drive systems and a controller. The upper door portion pivots about a primary axis formed by its juncture with a structural member in the roof while the lower door portion pivots about a secondary axis formed by its juncture with the upper door portion. Primary and secondary drive systems provide independent powered motion of the upper and lower door portions. The controller monitors door switch activation and determines whether activation corresponds to a door open or door closed command; performs preset door opening and closing sequences using the drive systems; and modifies the preset door opening and closing sequences based on data from proximity sensors, pinch sensors, latch sensors, drive system motor speed and the current draw by the drive systems.

22 Claims, 14 Drawing Sheets

CONTROL SYSTEM FOR USE WITH A DUAL HINGED VEHICLE DOOR

CROSS-REFERENCE TO RELATED APPLICATION

This application is a continuation of U.S. patent application Ser. No. 13/615,742, filed 14 Sep. 2012, the disclosure of which is incorporated herein by reference for any and all purposes. This application claims the benefit of the filing date of U.S. Provisional Patent Application Ser. Nos. 61/549,019, filed 19 Oct. 2011, 61/564,405, filed 29 Nov. 2011, and 61/594,971, filed 3 Feb. 2012, the disclosures of which are incorporated herein by reference for any and all purposes.

FIELD OF THE INVENTION

The present invention relates generally to automobiles and, more particularly, to a vehicle side door that provides greater access to the interior of the vehicle.

BACKGROUND OF THE INVENTION

For years, the automobile industry has been attempting to develop a stylish car door that provides suitable levels of passenger ingress and egress while still providing the desired level of safety. To date, the research and development in this area has centered around two distinct areas; (i) standard hinged car doors, i.e., those that are hinged along one side of the door, and (ii) side van doors. While side van doors typically provide superior access to the vehicle's interior due to the door's extended width, this type of door is not well suited for use with a conventional vehicle utilizing a non-van configuration. Accordingly, what is needed is a stylish vehicle door that improves upon vehicle access, especially when carrying children or large packages, and may be integrated into the various vehicle mechanical structures and safety systems. The present invention provides such a vehicle door.

SUMMARY OF THE INVENTION

A control system for use with a vehicle's dual hinged door assembly is provided, the control system including a door switch, first and second door portions, primary and secondary door drive systems and a controller. The door switch may be externally mounted (e.g., mounted to a door handle), internally mounted (e.g., mounted to an interior vehicle surface) or remotely mounted (e.g., mounted to a key fob). The first door portion is hingeably coupled to a structural member within the vehicle's roof such that it forms part of the roof when the door assembly is closed and such that it pivots about a primary axis formed by its juncture with the structural roof member. The second door portion is hingeably coupled to the first door portion such that it forms part of the vehicle's side when the door assembly is closed and such that it pivots about a secondary axis formed by its juncture with the first door portion. The controller is coupled to the door switch and the primary and secondary door drive systems and is configured to provide independent motion control of the first and second door portions in response to activation of the door switch. The controller is also configured to determine if activation of the door switch corresponds to a door open or a door closed command.

The system may include a plurality of position sensors coupled to the controller and providing position data for the first and second door portions. The position data provided by the position sensors may be used by the controller to determine if activation of the door switch corresponds to a door open or a door closed command, and/or to provide independent motion control of the first and second door portions via the primary and secondary drive system, and/or to perform preset door opening/closing sequences of motions.

The system may include a plurality of proximity sensors coupled to the controller and providing position data for obstacles located outside of the vehicle that may interfere with upper/lower door portion movement during performance of a preset door opening or closing sequence. When an obstacle is detected by the controller using the proximity sensors, the controller may be configured to modify the preset door opening or closing sequence and/or activate a warning indicator. The proximity sensors typically are configured to monitor specific zones, e.g., one or more zones located above the vehicle's roof and/or adjacent to the vehicle's side.

The system may include at least one latching mechanism that the controller may (i) activate to cinch closed the door assembly after completion of the door closing sequence, or (ii) activate to release the door assembly prior to performing the door opening sequence. A latch sensor is preferably used to provide latch position data to the controller, the latch position data corresponding to a latch open/latch closed position.

The system may include a plurality of pinch sensors coupled to the controller. When an obstacle is detected by the controller using the pinch sensors, the controller may be configured to modify the preset door closing sequence and/or activate a warning indicator.

The controller may be configured to monitor the current of the primary and secondary drive systems and to modify the preset door opening or closing sequence and/or activate a warning indicator when the monitored current exceeds a preset value.

The controller may be configured to monitor the motor speed corresponding to the primary and secondary drive systems and to modify the preset door opening or closing sequence and/or activate a warning indicator when the monitored motor speed falls below a preset value.

The primary drive system may be comprised of a primary hydraulic powered strut and a primary non-powered gas strut, the secondary drive system may be comprised of a secondary hydraulic powered strut and a secondary non-powered gas strut, and the control system may include a hydraulic pump and hydraulic valve system that provides independent motion control of the first and second door portions via the hydraulic pump and valve system.

A further understanding of the nature and advantages of the present invention may be realized by reference to the remaining portions of the specification and the drawings.

DESCRIPTION OF THE SPECIFIC EMBODIMENTS

Figure 1:
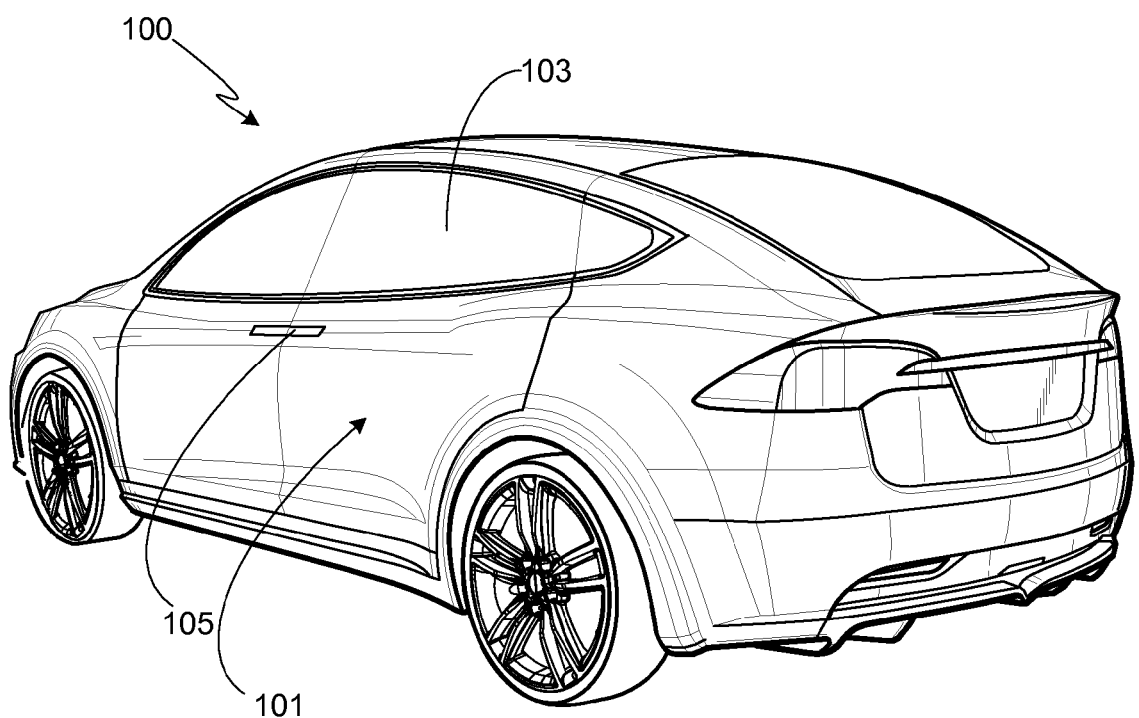
FIG. 1 provides a rear perspective view of a vehicle utilizing a dual hinged door assembly in accordance with the invention.

FIG. 1 provides a rear perspective view of a vehicle 100 utilizing a dual hinged door 101 in accordance with the invention. In the preferred embodiment, both the left rear and right rear doors utilize the dual hinged door described in detail below. It should be understood, however, that the dual hinged door of the invention may be used in the front, rear or both positions of a vehicle, and may be used on one or both sides of the vehicle.

Figure 2:
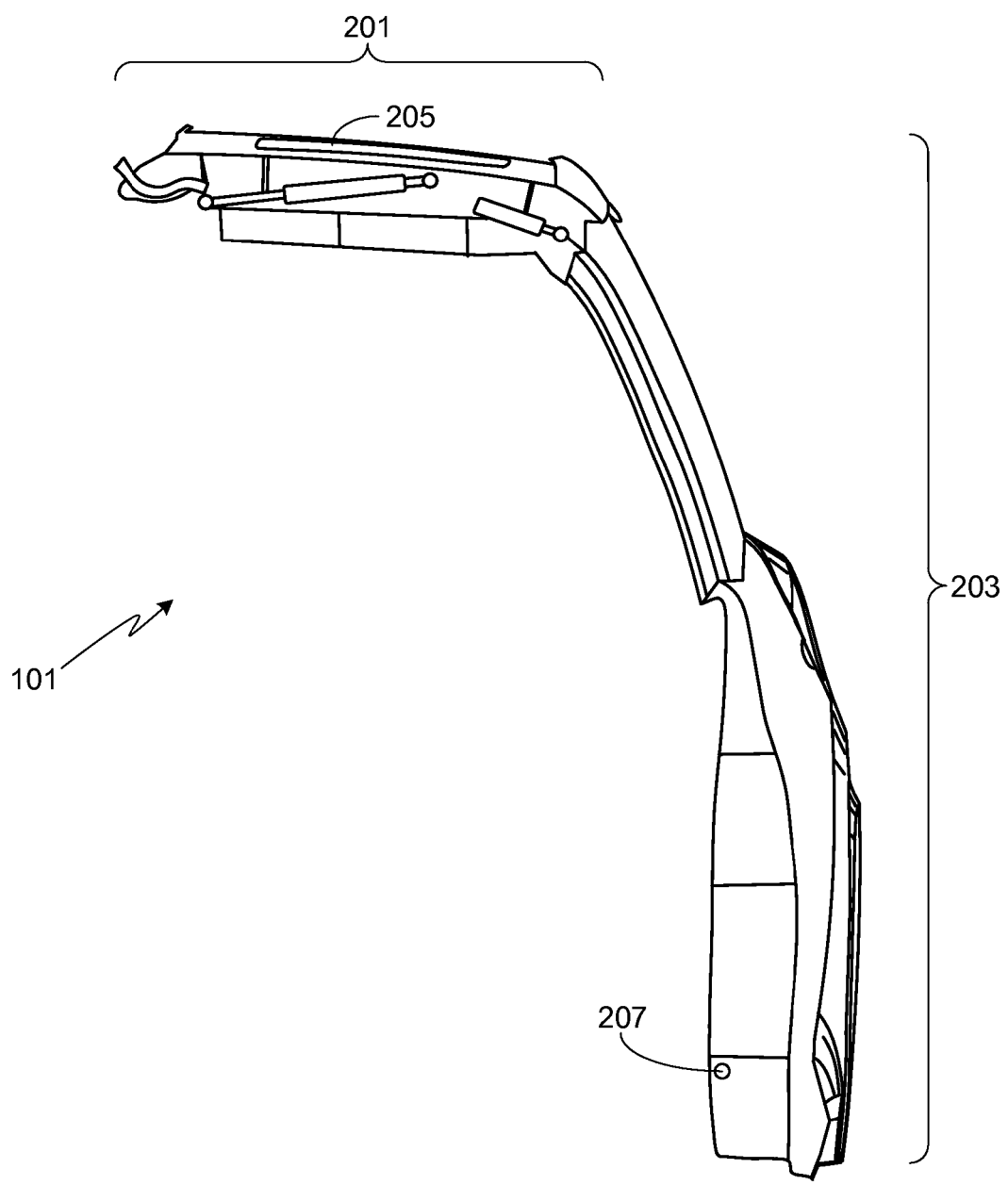
FIG. 2 provides a side view, taken from the front of the vehicle, of the preferred embodiment of the dual hinged door shown in FIG. 1.
Figure 3:
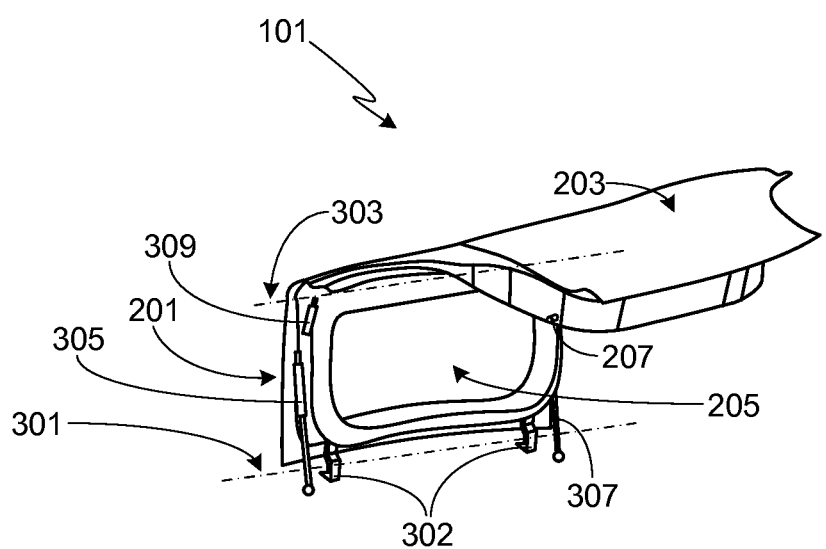
FIG. 3 provides an alternate view of the dual hinged door shown in FIGS. 1 and 2.

FIG. 2 provides a simplified side view, taken from the front of the vehicle, of the preferred embodiment of door 101. FIG. 3 provides an alternate view of door 101. Door 101 is divided into two primary portions, an upper portion 201 and a lower portion 203. Although not required, in the illustrated embodiment upper portion 201 includes a sunroof 205 while lower portion includes a window 103. The entire door assembly, i.e., upper and lower portions 201/203, has a primary, substantially horizontal hinge axis 301 that is approximately parallel with the vehicle's centerline. The entire door assembly 101 is hinged to vehicle 100, and in particular to a central roof portion of vehicle 100, utilizing a pair of hinges 302 that allow the entire assembly, i.e., both portions of the door, to pivot relative to the vehicle about axis 301. Hinges 302 are designed for stiffness in order to minimize door vibrations during the door opening and closing sequences. Gooseneck hinges are preferred in order to maintain a straight cutline on the door and to allow the door seals to break away without having a large drain trough.

In the illustrated embodiment, primary axis 301 is located a few millimeters below the roof of vehicle 100, and approximately one third of the distance between the vehicle centerline and a line defined by the cant rail of the car. A secondary, substantially horizontal axis 303 that is substantially parallel to the vehicle's centerline couples lower door portion 203 to upper door portion 201, thus allowing lower door portion 203 to pivot about upper portion 201. In the illustrated embodiment, secondary axis 303 is located close to the cant rail line as shown. As described in detail below, preferably door 101 is configured to allow the two door portions 201/203 to move independently of one another. Independent movement allows door 101 to be opened in a variety of situations in which obstacles may be present next to or above the vehicle, and at varying distances from the vehicle.

In the preferred embodiment of the invention, both portions of door 101 are powered, thus allowing the door to be easily and quickly opened. A completely powered door as described herein also allows the door controller to reconfigure door movement in light of various situations (e.g., parked in a garage with a low ceiling). Preferably even if the door portions are powered, the system is configured to allow manual operation in order to provide emergency ingress/egress if the power system fails. In addition to the powered configuration, the door may be configured as an unpowered, manually operated door. Alternately, only the primary axis of the door may be powered while the secondary axis of the door, i.e., the axis at the roof rail, may be designed as a dummy axis that rotates with the pull of gravity and includes stops to prevent over and under rotation. Alternately, only the primary axis of the door may be powered while secondary axis rotation is linked to door rotation about the primary axis through the use of linkages and/or gears.

The normal unobstructed door opening sequence, i.e., motion of door 101 when it is in the closed position and there are no obstacles in the way, is initiated when a user presses or otherwise activates one of the door switches for at least the preset minimum period of time (e.g., 500 milliseconds). The door switch may be externally mounted (e.g., on or coupled to door handle 105), internally mounted (e.g., on the inner door surface or arm rest), remotely mounted (e.g., on a key fob) or remotely activated (e.g., remotely accessed using a web-based or cell-based application). In the preferred embodiment, normal door motion maintains the door, specifically lower door portion 203, as close to the vehicle as possible (e.g., approximately 20 millimeters) during the initial stages of opening, thus minimizing the risk of the door running afoul of a close-by obstacle. In one embodiment after upper door portion 201 is at about 40° relative to the horizontal plane, lower door portion 203 stops moving relative to upper door portion 201. Then when the upper door portion 201 is significantly open, e.g., to about 70° relative to the horizontal plane, lower door portion 203 begins to extend outwards. In the preferred embodiment, during normal opening of door 101 proximity sensors are constantly checked for obstacles. Additionally, assuming a powered door, the current draw of the power mechanism is also monitored since a spike may indicate that the door has hit an obstacle. Accordingly, in the preferred embodiment which utilizes a hydraulic power mechanism, the current draw of the hydraulic pump motor is constantly checked for spikes that may indicate an obstacle. If an obstacle to door movement is detected, the normal opening algorithm terminates and an appropriate alternative algorithm takes over.

In the preferred embodiment, vehicle door 101 goes through four primary stages of motion during a normal, unobstructed opening sequence. These four stages are illustrated in FIGS. 4-7, each of which shows a front view of vehicle 100. It should be understood, however, that the dual hinged door of the invention may utilize a different opening sequence while still retaining the benefits of the dual hinged design. For example, stages three and four may be combined into a single stage.

Figure 4:
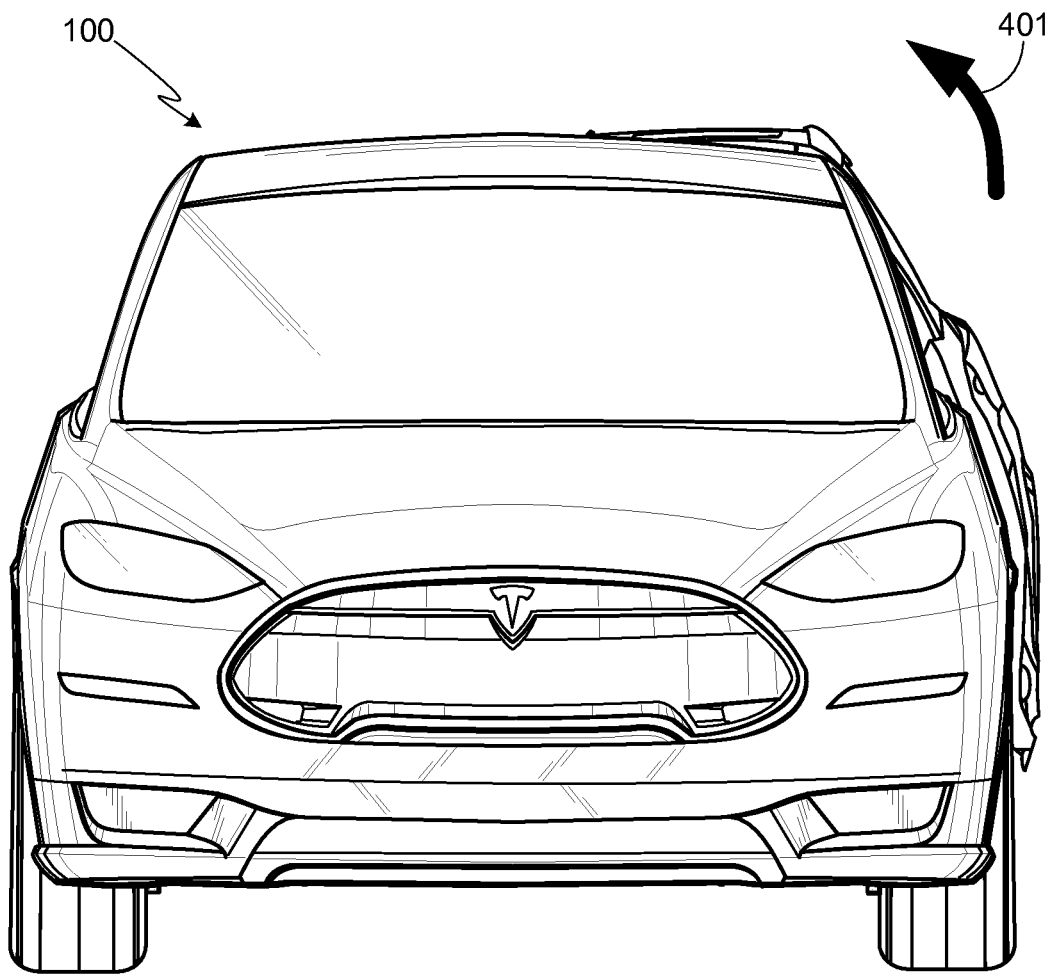
FIG. 4 provides a front view of the vehicle shown in FIG. 1 with the left rear dual hinged door undergoing the first stage of normal opening.
Figure 5:
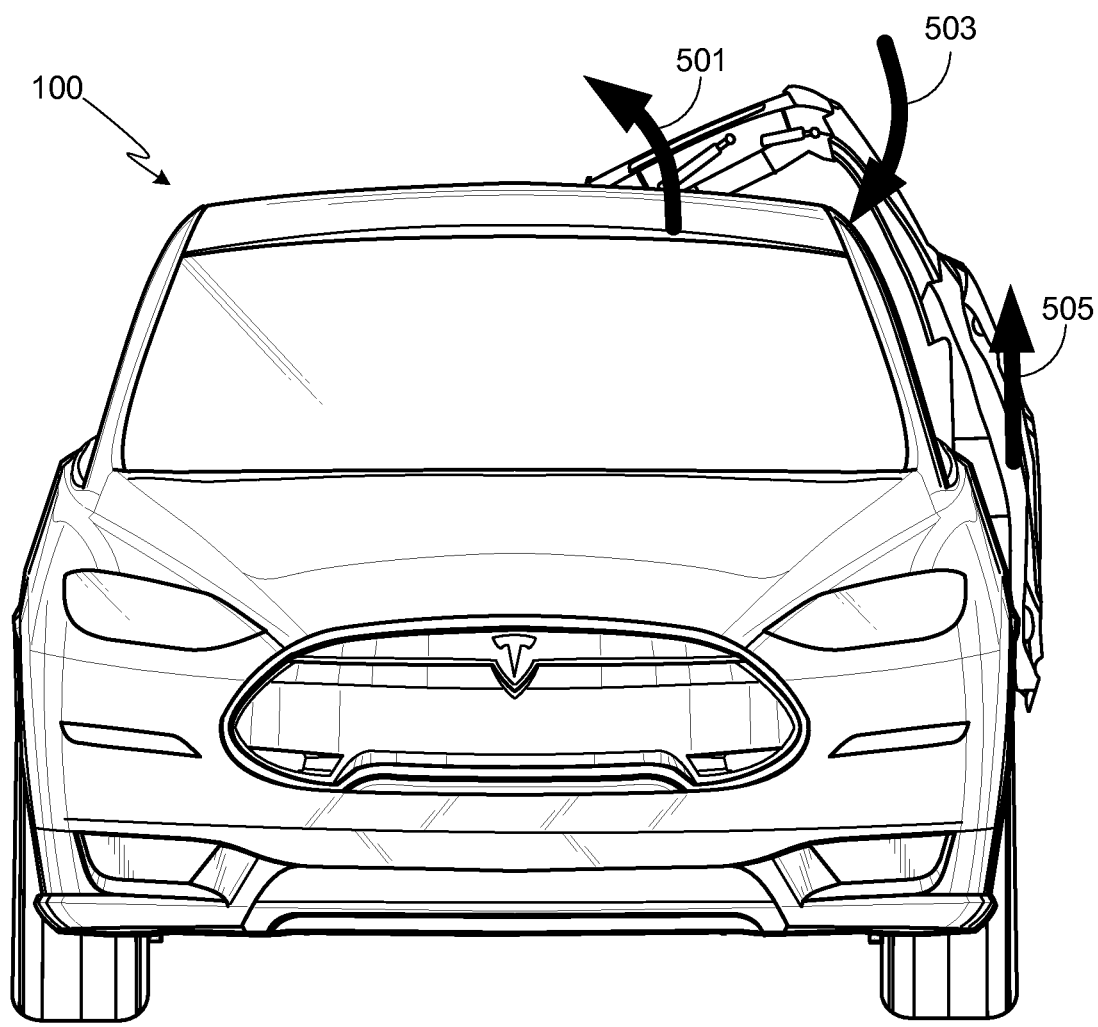
FIG. 5 provides a front view of the vehicle shown in FIG. 1 with the left rear dual hinged door undergoing the second stage of normal opening.

In the first stage of the normal, unobstructed door opening sequence, illustrated in FIG. 4, once the door latches have been released and power is applied to the power mechanism, the door acts as gullwing with the entire door 101, i.e., both upper and lower door portions, rotating about primary axis 301 (see directional arrow 401). During this stage, lower door portion 203 is locked relative to upper door portion 201. The purpose of stage one of the opening sequence is to separate the door from the door seals and move door structure 101 away from the vehicle structure. Typically stage one is quite short, for example continuing until upper door portion 201 has moved to a position that is between 3 and 15 degrees off horizontal, and preferably to between 5 and 10 degrees off horizontal.

As the door opening sequence continues, door movement transitions between the first and second stages. In the second stage, illustrated in FIG. 5, the entire door 101, i.e., both upper and lower door portions, continues to rotate about primary axis 301 (see directional arrow 501). At the same time as the door structure is rotating outwardly about primary axis 301, lower door portion 203 is rotating inwardly about secondary axis 303 (see directional arrow 503). This combined operation allows lower door portion 203 to move upward along direction 505, maintaining a constant, or near constant, separation between the lower door portion 203 and vehicle 100. Preferably this separation is on the order of a few millimeters (e.g., 1-30 millimeters, more preferably approximately 20 millimeters). One of the main benefits of having the lower door section 203 slide upwards, rather than rotate as with a conventional gullwing, is that it allows the door to open even if there is another object, such as another car, immediately adjacent to the vehicle. Preferably stage two continues until upper door portion 201 has rotated to a position that is between 35 and 45 degrees off horizontal, and preferably to a position of about 40 degrees.

Figure 6:
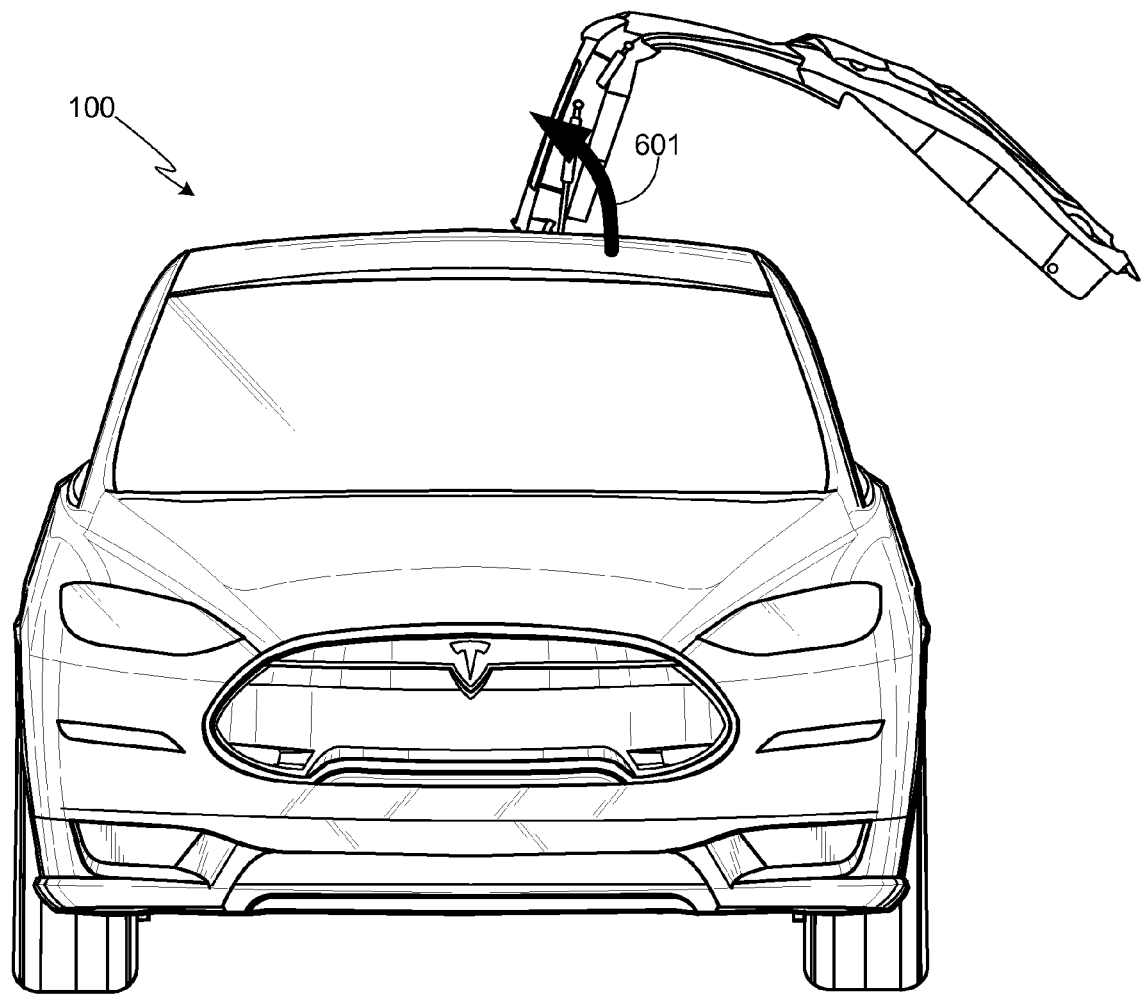
FIG. 6 provides a front view of the vehicle shown in FIG. 1 with the left rear dual hinged door undergoing the third stage of normal opening.

In the third stage of the door opening sequence, illustrated in FIG. 6, rotation of lower door portion 203 relative to upper door portion 201 about axis 303 stops, thereby locking together the two door portions. Rotation of the entire door 101, i.e., both the upper and lower door portions, continues about primary axis 301 (see directional arrow 601) until upper door portion 201 has rotated to a position that is between 65 and 75 degrees off horizontal, and preferably to a position of about 70 degrees.

Figure 7:
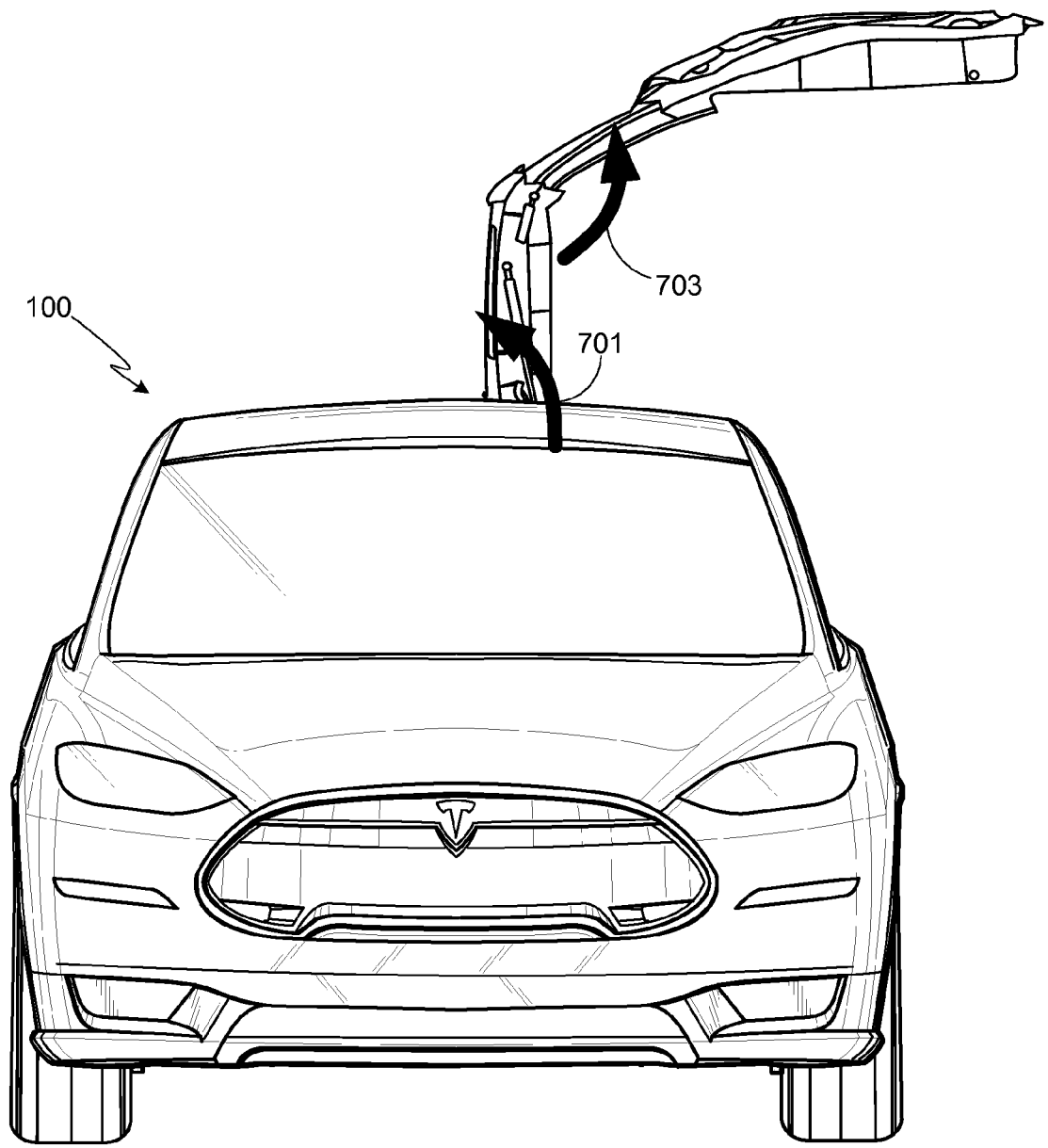
FIG. 7 provides a front view of the vehicle shown in FIG. 1 with the left rear dual hinged door undergoing the fourth stage of normal opening.

In the fourth stage of the normal door opening sequence, illustrated in FIG. 7, the entire door 101, i.e., both upper and lower door portions, continues to rotate about primary axis 301 (see directional arrow 701) until upper door portion 201 has rotated its maximum open position, preferably to a position that is between 90 and 95 degrees off horizontal. At the same time as the door structure is rotating outwardly about primary axis 301, lower door portion 203 is rotating outwardly about secondary axis 303 (see directional arrow 703) until it reaches its maximum open position. The normal door closing sequence, initiated when the door is open and a user presses one of the door buttons and holds it for at least the preset minimum period of time (e.g., 500 milliseconds), is simply the reverse of the normal door opening sequence.

Power Mechanism

Although the dual hinged door 101 of the invention may be manually operated, preferably the door is powered, thus simplifying its operation, especially for children, small adults or individuals carrying something (e.g., package, baby, etc.). With respect to a powered configuration, the inventors have found that the dual hinged design is compatible with a variety of different power systems that may be used to provide the power necessary to move door 101 relative to vehicle 100, and to move lower door portion 203 relative to upper door portion 201.

The preferred power mechanism, also referred to herein as the door drive mechanism, uses two pairs of struts for a single door 101, one pair used to move door 101 about primary axis 301 and the second pair used to move lower door portion 203 relative to upper door portion 201 about secondary axis 303. Each pair of struts includes a powered strut and a non-powered strut, the two struts preferably mounted on either side of the door as shown (e.g., powered and non-powered primary struts 305 and 307 in FIG. 3; note that due to the angle of door 101 in this figure, only one of the secondary struts, i.e., strut 309, is visible).

The non-powered strut in each pair of struts is a gas strut, for example a nitrogen filled gas spring. The non-powered struts perform several functions. First, the primary non-powered gas strut is used to overcome most of the mass of door 101 while the smaller, secondary non-powered gas strut is used to overcome most of the mass of the lower door portion 203. By using non-powered struts to balance most of the door mass, the power requirements placed on the powered struts may be greatly reduced since the powered strut in such a configuration is basically only required to overcome the variations between the spring force provided by the non-powered gas strut and the door weight. Second, by locating the non-powered strut on the opposite side of the door from the powered strut, improved door balance and stability are achieved. Third, if power is lost to the powered struts, manual operation of the door is still quite easy, thus providing emergency ingress/egress.

Although the powered primary and secondary struts may utilize an electric actuator, e.g., a worm gear driven by a gear motor, preferably the powered struts are hydraulic rams powered by a small electro-hydraulic pump actuated by a valve block that directs and regulates fluid flow to each of the rams. A pressure relief valve is preferably used to ensure that any pressure in excess of the relief valve's setting is bled off. In at least one embodiment, the pressure relief valve is set to just above the required pressure to open the door. The use of a pressure relief valve ensures that if there is a control system failure that allows the door to open into an object (e.g., a garage wall), the door will simply stop and the excess pressure will be relieved. Additionally, if someone pulls the door down while it is open, the door will close and the pressure will bleed off instead of overloading the mechanical assembly.

In a second, alternate configuration, door rotation about primary axis 301 is driven by a planetary gearmotor mounted within the roof of vehicle 101. The motor is geared down in order to provide the desired level of torque. This approach is not preferred, however, due to the loss of head room within vehicle 101, this loss resulting from the inclusion of the planetary gearmotor along with the padding required between the motor/drive mechanism hardware and the passenger compartment ceiling in order to achieve the desired level of head impact protection.

Figure 8:
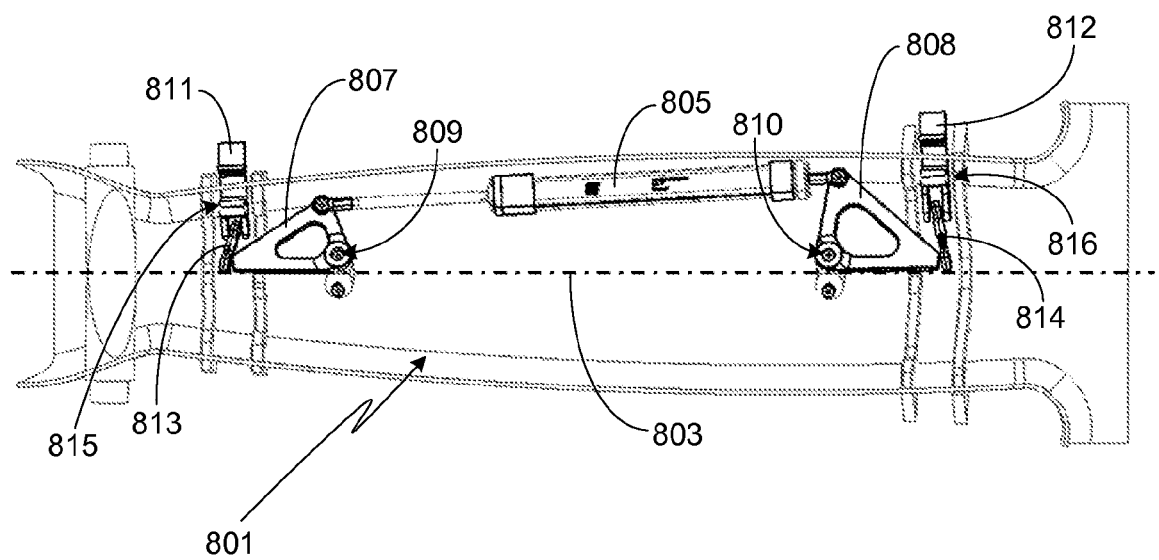
FIG. 8 illustrates a roof mounted power strut design in accordance with an alternate embodiment of the door power mechanism.

In a third, alternate design, primary door movement about axis 301 is controlled by a power strut mounted within a small section in the spine of the roof. The power strut may utilize either a hydraulic ram or a worm gear driven by a gear motor. If the vehicle utilizes two dual hinged doors, i.e., a dual hinged door mounted on either side of the vehicle as preferred, then a pair of power struts is mounted within the roof, one for use with each door. FIG. 8 illustrates an exemplary configuration mounted within roof portion 801, and to one side of vehicle centerline 803. In order to simplify the figure, the power mechanism for only a single door is shown. Power strut 805 floats between a pair of bellcranks 807/808 that rotate about axes 809/810, respectively. Bellcranks 807/808 are coupled to the primary door hinges 811/812 via pushrods 813/814 so that when the bellcranks rotate, hinges 811/812 rotate about axes 815/816, respectively. As a result, expansion or contraction of power strut 805 causes rotation of the bellcranks 807/808 as well as hinges 811/812. Since the door is a rigid member, the load is automatically distributed appropriately between the front and rear hinges 811/812. Assuming dual hinged doors, in one configuration the power mechanism is set up so that the bellcranks on the left side door use the same pivot point as the bellcranks on the right side. Preferably, and in order to avoid possible interference between the pushrods, the bellcranks are pulled together and the pushrods are mounted to the door closest to the ram (so that they are not crossing).

Figure 9:
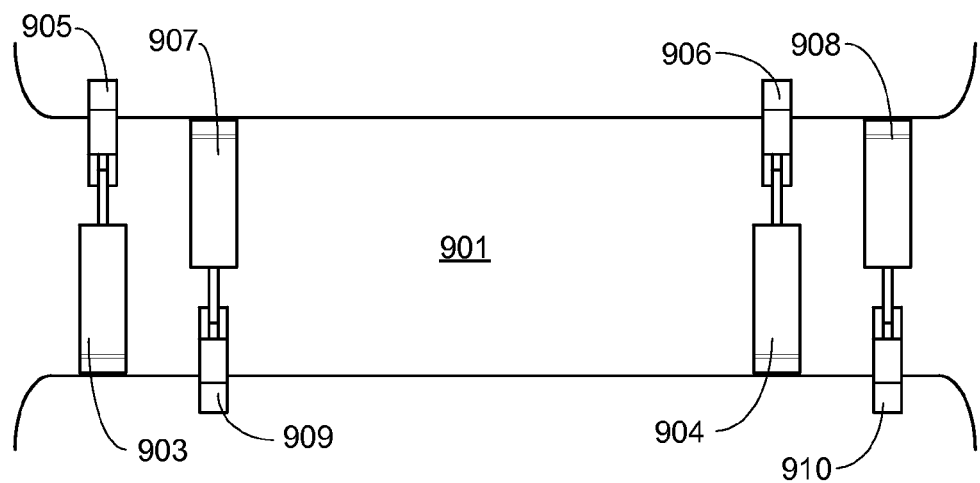
FIG. 9 illustrates an alternate roof mounted power strut design in accordance with an alternate embodiment of the door power mechanism.

A fourth alternate design, illustrated in FIG. 9, also mounts the powered struts within a section of the roof. However, rather than coupling the struts to the hinges via bellcranks as in the embodiment described above, the struts are configured to act directly on the hinges. In the illustration shown in FIG. 9, two pair of struts are shown attached to roof portion 901, struts 903/904 acting on hinges 905/906 associated with one dual hinged door (not shown), and struts 907/908 acting on a second set of hinges 909/910 associated with a second dual hinged door (not shown). Of course a single set may be used if the vehicle only uses a single dual hinged door. Preferably if one or both struts are powered, the powered strut(s) utilizes a hydraulic ram, although a worm gear driven by a gear motor may also be used. It will be appreciated that this arrangement allows a variety of possible configurations. For example, both struts (e.g., 903/904) acting on a single door may be powered or one may be powered and one may be unpowered. If both struts are powered, then preferably at least one non-powered strut is also coupled to the door, for example mounted to the side of the door as described and shown relative to the preferred embodiment, thus reducing the mass required to be moved by the powered struts as well as improving manual operation of the door in the case of drive system power loss or malfunction.

Figure 10:
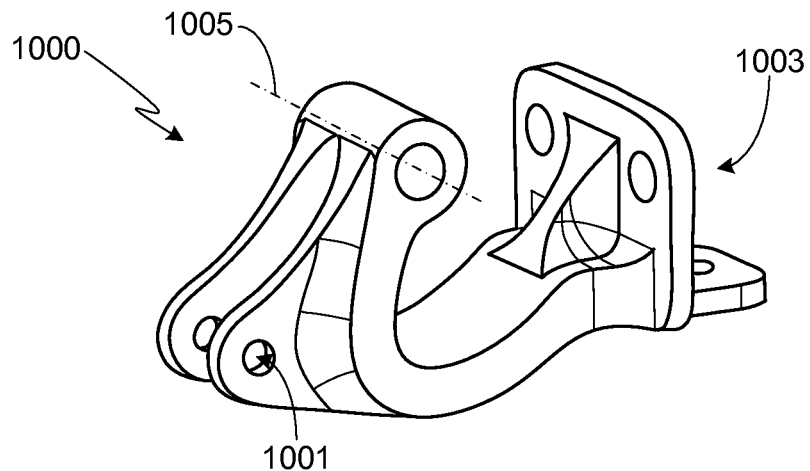
FIG. 10 illustrates an exemplary door hinge.

An exemplary hinge is shown in FIG. 10. The strut, or pushrod in the case of the configuration shown in FIG. 8, is attached at 1001 while the door, specifically upper door portion 201, is attached at 1003. During motion hinge 1000 pivots about axis 1005.

Sensors

In accordance with the preferred embodiment of the invention, multiple sensors of varying type are used to provide feedback to the door controller, both with regards to door movement as well as obstacles that may prevent the door from performing a normal opening sequence or a normal closing sequence.

Position Sensors: Preferably the door controller is provided with real-time access to door position information that is used to determine when to transition between each stage of door movement, e.g., stages 1-4 of door motion as described in detail above. In the preferred embodiment in which both the upper and lower portions of the dual hinged door are independently powered, the position sensors provide feedback as to the position of upper door portion 201 relative to the vehicle, and feedback as to the position of lower door portion 203 relative to upper door portion 201. It will be appreciated that there are various types of sensors that may be used to provide door position information and that the choice depends, at least in part, on the type of power mechanism used to control door movement. In the embodiment in which hydraulic rams are used, e.g., rams 305 and 309, linear displacement sensors are mounted to the rams, thus providing accurate ram feedback which, using a simple look-up table stored in the memory associated with the door controller, provides accurate feedback as to the positions of the upper and lower door portions, both relative to one another and to the vehicle.

Latch Sensors: In at least one embodiment, in addition to sensors that monitor the positions of the upper and lower door portions, for example by monitoring the relative locations of the door drive mechanisms, the system also includes one or more door closure sensors, also referred to herein as latch sensors. The latch sensors monitor the positions of one or more latches that, as described below, are preferably used to hold the door within the closed position. The latch sensors provide feedback as to whether or not door 101 is cinched shut or unlatched.

Pinch Sensors: In at least one embodiment, the door controller determines whether or not there is an obstacle preventing complete closure of door 101 by monitoring the current and/or the motor speed of the hydraulic pump motor used to control movement of door portions 201 and 203. If the current exceeds a preset value, or falls outside of a preset range of values, the door may be blocked by a person or object. Similarly, if the motor's speed unexpectedly slows down or falls below a preset rpm, the door may be blocked. Preferably the door controller is configured to perform a preset response, such as terminate door movement and/or reverse door direction, whenever a non-normal current or a non-normal motor speed is detected.

While the door controller may rely on the current draw or the motor speed of the hydraulic pump motor, or other door mechanism power motor, to determine if an obstacle is preventing door closure, preferably one or more pinch sensors are located at critical locations around door 101, the pinch sensors providing a rapid and absolute indication that an obstacle is obstructing normal door closure. Pinch sensors, also commonly referred to as pressure sensors or pressure sensitive edge sensors, are typically coupled to, or mounted within, a seal or other elastic member or strip that is mounted around much if not all of the door's perimeter. Pinch sensors may also be mounted at various junctions that present a possible hazard, for example the junction between the upper and lower door portions. The door controller is configured to perform a preset response, such as terminate door movement and/or reverse door direction, whenever a pinch sensor detects an obstruction.

Proximity Sensors: In order to ensure that door 101 does not run afoul of an external object during operation, such as an adjacent parked car or a low lying ceiling, the door controller of the invention is coupled to one or more proximity sensors. The proximity sensors are located to monitor critical areas about the car.

Figure 11:
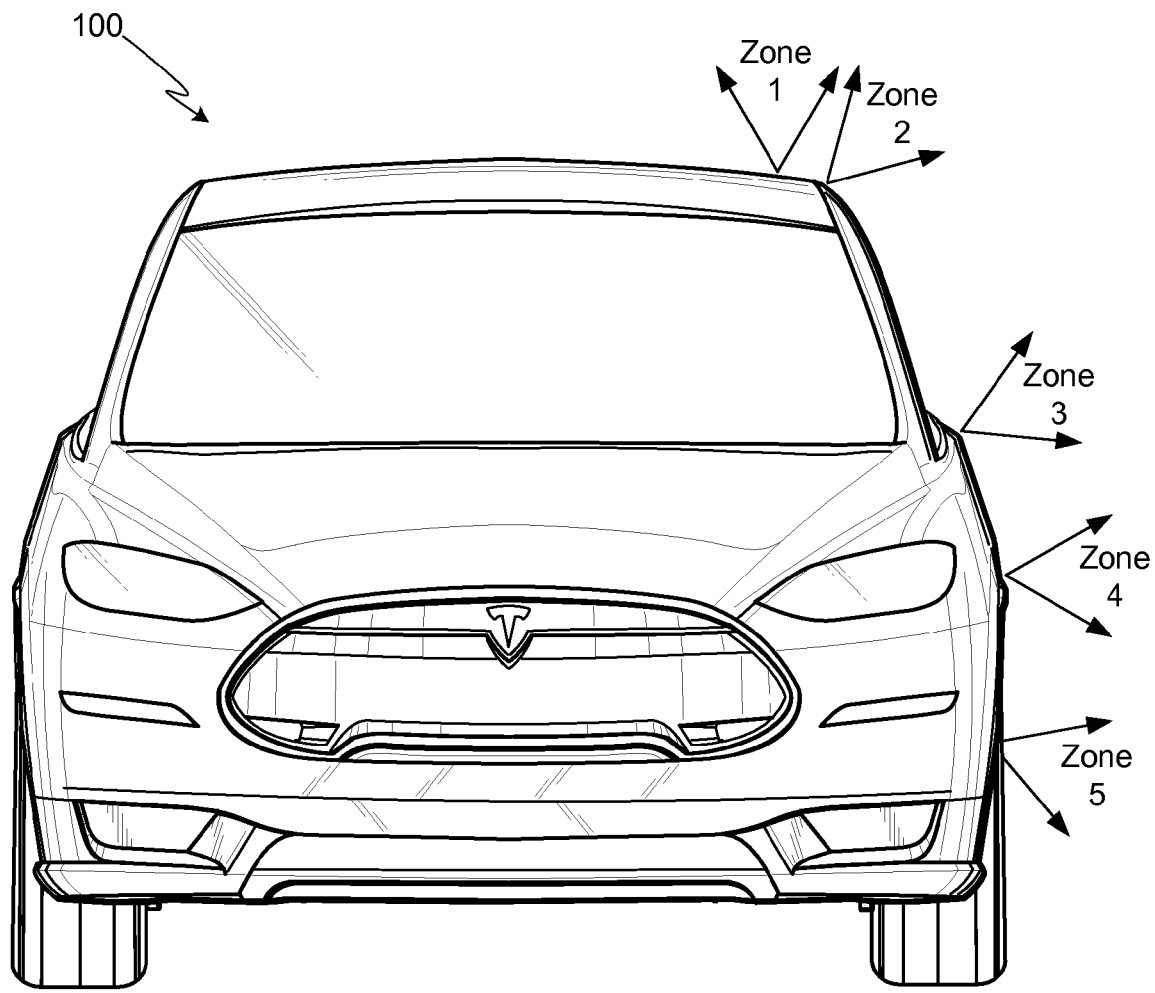
FIG. 11 illustrates the zones monitored by the system's proximity detectors in the preferred embodiment of the invention.

In the preferred embodiment, the proximity sensors are designed to monitor five distinct zones, thus providing sufficient information to the door controller to ensure that the best course of action is taken given an object's location relative to the door. FIG. 11 provides a similar view of vehicle 100 as that shown in FIGS. 4-7 except that door 101 is in the closed position and the preferred zones monitored by the proximity sensors are shown. Preferably each zone runs at least the entire width of the door. Zone 1 provides information regarding the proximity of objects, such as a garage roof, that lie directly above the vehicle; zone 2 provides information regarding the proximity of objects both above and to the side of the cant rail; zones 3 and 4 provide information regarding the proximity of objects immediately adjacent to the middle of the door; and zone 5 provides information regarding the proximity of objects near the lower edge of door 101. It will be appreciated that both fewer and greater numbers of proximity detectors may be used, depending upon the amount of information required about potential obstacles in order to properly operate the door. Typically the size of each portion of the door as well as the desired normal opening and closing sequences control the number of zones required to accurately and efficiently control door movement.

Door Controller

Figure 12:
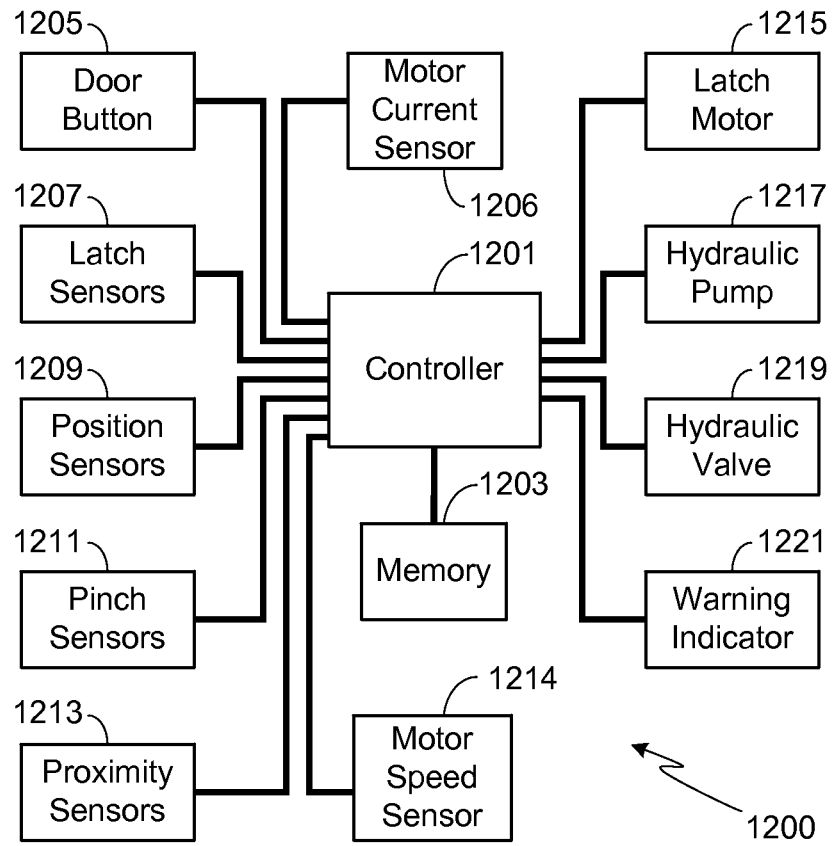
FIG. 12 provides an overview of the control system for the dual hinged door of the invention.

FIG. 12 provides an overview of the control system 1200 that is used to monitor and control operation of the dual hinged door of the invention. System 1200 includes a controller 1201, referenced above, that determines and performs the appropriate door response in view of data monitored by a variety of sensors and in accordance with a preset set of response instructions. Controller 1201 may be a stand-alone controller or integrated into another vehicle control system, for example a vehicle management system. In addition to a control processor, controller 1201 may also include a memory 1203 for storing a preset set of control instructions and/or recording event information. Memory 1203, which may be a stand-alone memory module or integrated into controller 1201, may be comprised of flash memory, a solid state disk drive, a hard disk drive, or any other memory type or combination of memory types.

Controller 1201 may be configured to receive door open and door close commands from any of a variety of different input means 1205. Exemplary door buttons 1205 include an exterior door handle button or sensor, an interior door button or sensor, a remotely mounted switch or activation means (e.g., key fob button or key fob RFID), and web-based/cell phone based means. Once a door open or door close command is received from a door button 1205, controller 1201 utilizes a variety of sensors (e.g., latch sensors 1207, position sensors 1209, pinch sensors 1211, proximity sensors 1213, motor current monitor 1206, and motor speed sensor 1214) to determine, based on a preset set of response instructions, an appropriate response. As described in detail below, the response of controller 1201 is continually updated during the door open/door closed sequences as new data is acquired from the door position, pinch and proximity sensors. For example, the detection of an object blocking the normal pathway of door 101 will cause controller 1201 to deviate from the normal opening or closing sequence.

Once the door open or door close command is received, controller 1201 performs a pre-programmed door movement sequence. For example, the stages associated with the normal, unobstructed door opening sequence and the normal, unobstructed door closing sequence for the preferred embodiment are described in detail above. During these processes, controller 1201 utilizes a latching motor 1215 to either unlatch the door prior to initiating the door opening sequence, or to cinch down the door after completing the door closing sequence. In the preferred embodiment, a pair of conventional latches is used for these purposes with one of the latches located near the bottom of the front edge of the door and the second latch located near the middle of the rear edge of the door. The striker for the front latch assembly is visible in FIG. 2 (e.g., striker 207). As previously noted, the latches may also be operated manually in case the power door mechanism is not functioning properly.

Assuming the use of a hydraulic door power system as preferred, controller 1201 controls the pressure within the power struts using a hydraulic pump 1217 and a hydraulic valve system 1219. While the primary and secondary power struts may utilize separate hydraulic pumps and valves, preferably a single hydraulic pump is used for both the power struts of a single door 101 and, in at least one embodiment, both the power struts in both a left vehicle and right vehicle door 101. Valve system 1219 provides precise control over the operation of the individual power struts. It should be understood that if the drive system for the power door 101 utilizes an alternate system, pump and valve systems 1217/1219 would be replaced with a suitable system under the control of controller 1101.

In the preferred embodiment, a warning indicator 1221 is also coupled to control system 1200. Indicator 1221 may be an audible indicator, a visual indicator (e.g., warning light on the dashboard or vehicle interface), or both. Controller 1201 may be programmed to activate warning indicator 1221 whenever the door is in motion, thus warning passengers and by-standers to be aware of the door's movement. Typically in this scenario an audible warning (e.g., a low volume series of beeps) is preferred with the warning sound emitted in the general vicinity of the moving door. Controller 1201 may also be programmed to activate warning indicator 1221 whenever an obstacle is detected, thus warning the operator as well as passengers and by-standers that the door will have to follow an alternate path and/or terminate movement.

Figure 13A:
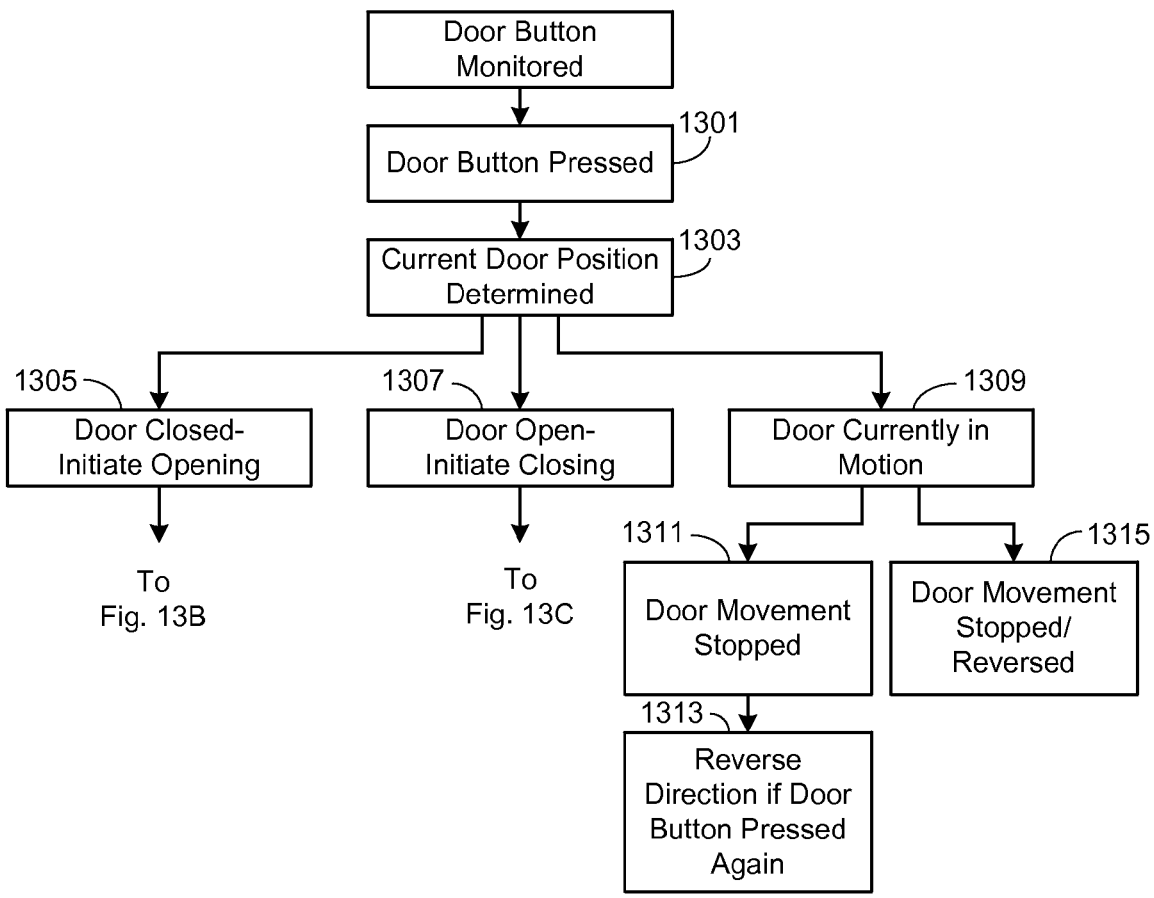
FIGS. 13A-13C illustrate the preferred methodology applied by the door controller for various door operational scenarios.
Figure 13B:
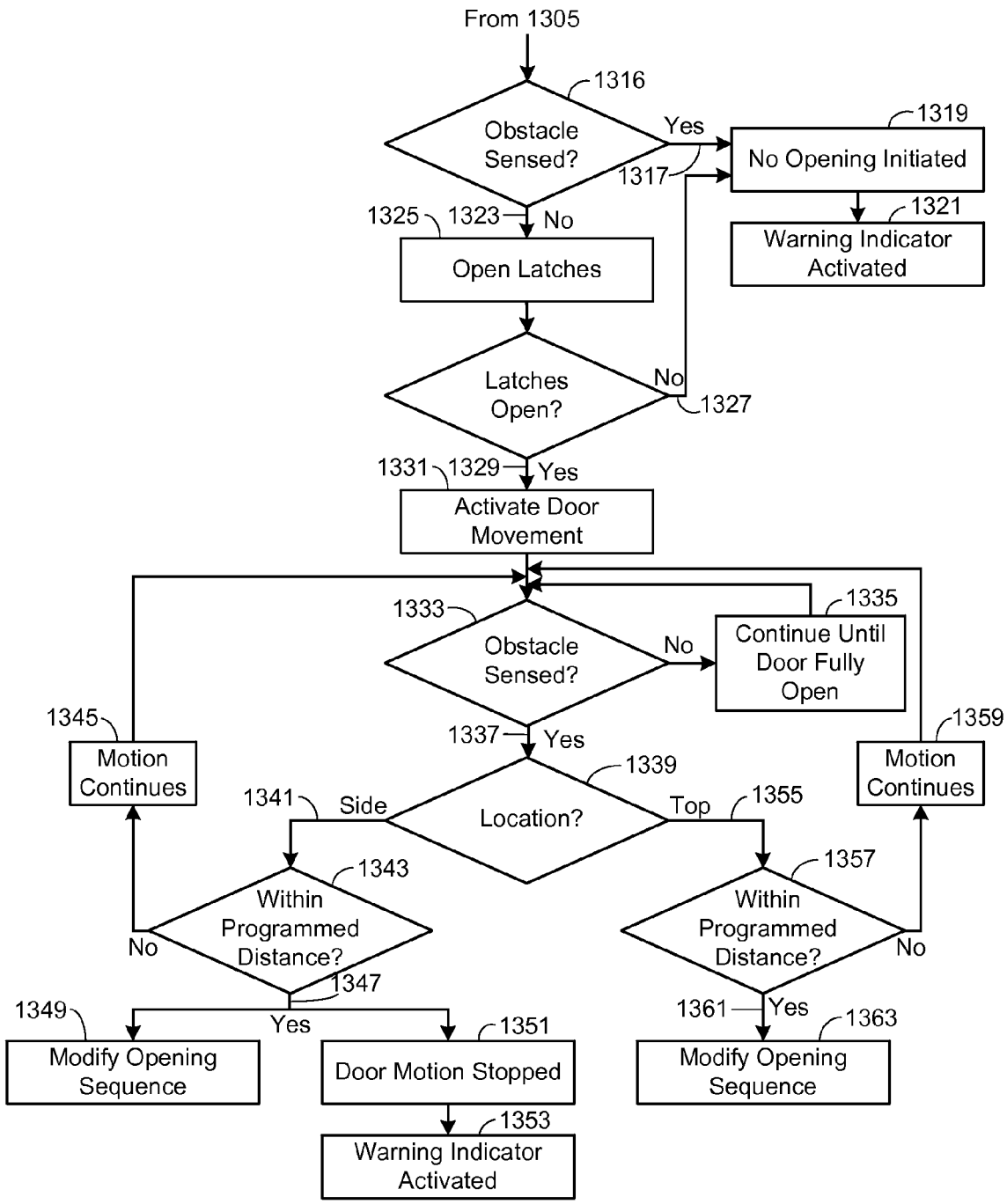
Figure 13C:
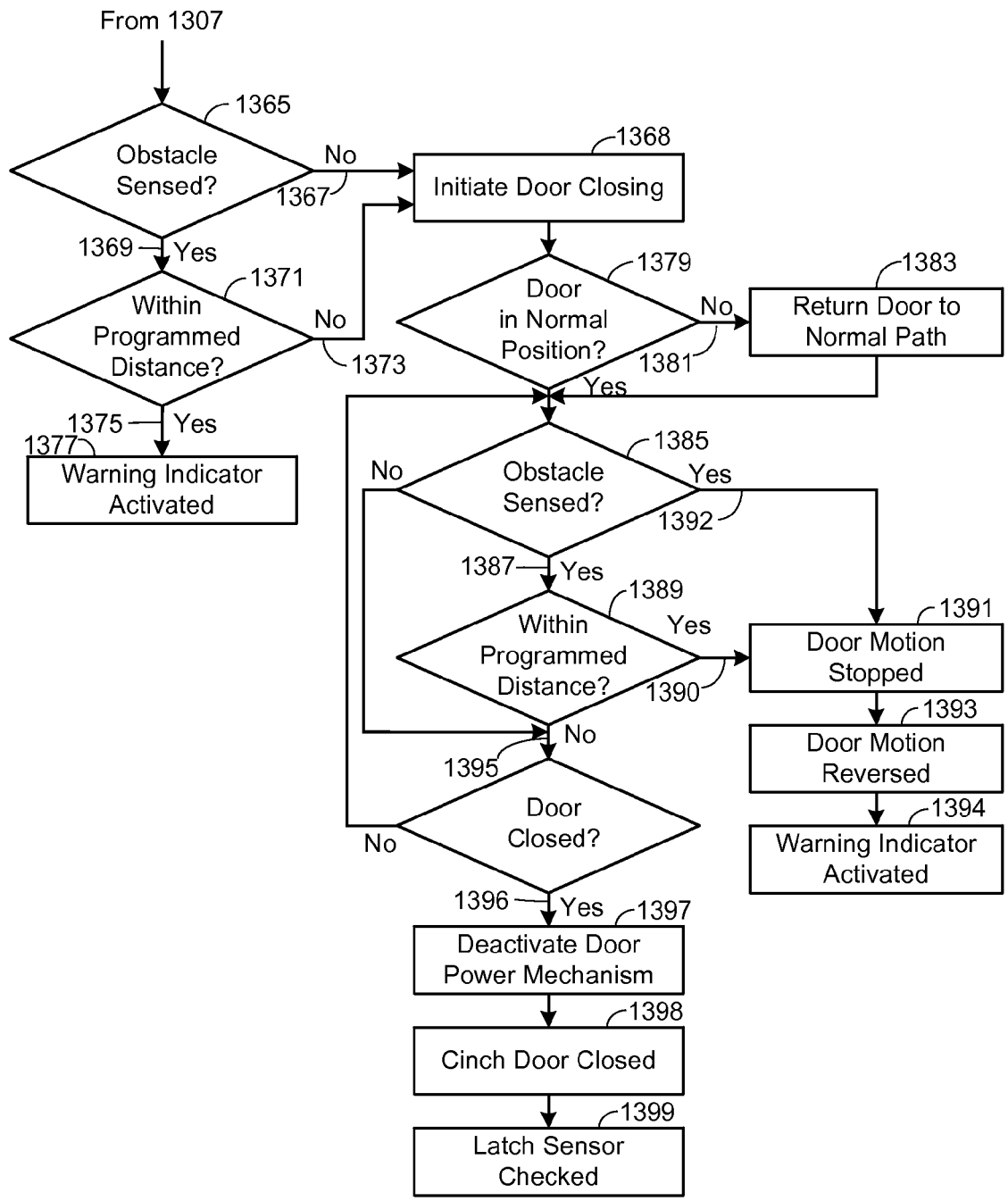

While the basic and preferred door opening/closing sequences were described above relative to FIGS. 4-7, these sequences may be altered in response to the detection of a non-normal event, such as an object obstructing the door from following the normal opening/closing sequence. The altered response performed by controller 1201 depends upon the location of the detected obstruction, the position of door 101 relative to the obstruction and the affected stage of the door opening/closing sequence. FIGS. 13A-13C illustrate the preferred methodology applied by door controller 1201 for various door operational scenarios.

When controller 1201 determines that a door button 1205 has been pressed or otherwise activated (step 1301), the controller then determines the current position of the door, i.e., whether the door is open, closed, or in the middle of a door opening or closing sequence (step 1303). If the door is currently closed, then the door opening sequence is initiated (step 1305). If the door is currently open, then the door closing sequence is initiated (step 1307). If the door is currently in the process of opening or closing (step 1309), then in one embodiment the controller simply stops movement of the door (step 1311). When the door button is pressed/activated again, the controller reverses the door's direction (step 1313), i.e., reversing from an opening to a closing sequence or reversing from a closing to an opening sequence. In an alternate embodiment, if the door button is activated when the door is in motion (step 1309) the controller immediately stops the door's motion and reverses its direction (step 1315).

The normal opening and closing sequences in which door movement is unobstructed are described in detail above. As noted, in the preferred embodiment of the dual hinged door of the invention, the opening and closing sequences are each divided into four primary stages of movement, although either fewer or greater numbers of stages may be used.

When the door open sequence is initiated (step 1305), controller 1201 checks the proximity sensors 1213 to determine if there is an obstacle in close proximity to the door (step 1316), for example if the car has been parked too close to an adjacent building wall or another vehicle has parked too close to the door. In the preferred embodiment this distance is set at 2 inches, although other distances may be used. If such an obstacle is detected prior to initiating door movement (step 1317), the door opening process does not begin (step 1319). Preferably warning indicator 1221 is activated at this point (step 1321), thus alerting the user of the problem.

If an obstacle is not detected (step 1323) when the door open sequence is initiated (step 1305), controller 1201 activates the door latches 1215 (step 1325) and then verifies that the latches have been opened using sensors 1207 (step 1327). If the latches malfunction (step 1327), the door opening process does not begin (step 1319) and preferably the warning indicator 1221 is activated (step 1321) to alert the user of the malfunction. If the latches open properly (step 1329), then controller 1201 activates the hydraulic pump 1217, controlling the door opening speed as well as movement of both the upper and lower door portions (step 1331). Door speed and control of upper and lower door motion is accomplished using variable valve 1219 and by controlling the current to hydraulic pump 1217, preferably using pulse width modulation (PWM).

Once initiated, the door opening sequence follows the preset opening sequence of motions, e.g., the four stages of motion described above. As the door opens, controller 1201 monitors the position sensors 1209, also referred to as displacement sensors, which provide feedback as to the relative locations of the door sections. Preferably controller 1201 also monitors motor speed using sensor 1214, thereby obtaining feedback on door speed. Controller 1201 independently adjusts the pressure and flow to the two power struts to ensure that the door sections, i.e., portions 201 and 203, are in their prescribed relative locations for each stage of the door opening swing. Throughout the sequence controller 1201 monitors the proximity sensors 1213 (step 1333) to ensure that an obstacle is not obstructing the motion of one or both door portions. As previously noted, preferably controller 1201 also monitors the current of the power mechanism (e.g., sensor 1206) as well as its speed (e.g., sensor 1214), stopping door motion if the current exceeds a preset value or the motor speed suddenly drops.

During the opening sequence, if no obstacles are encountered the door continues to open until it is fully open (step 1335). If an obstacle is encountered during the opening sequence (step 1337), then the controller determines in which zone the obstacle is located (step 1339). If the obstacle is to the side of the vehicle (step 1341), for example located in zones 4 or 5, or in some embodiments within zones 3-5, the controller determines if the obstacle lies within the programmed distance (step 1343). In the preferred embodiment the programmed distance is set at 2 inches. If the obstacle is outside of this distance, the door continues to open normally (step 1345) while continuing to monitor for obstacles. If the obstacle lies within the programmed distance (step 1347), in some embodiments the door opening sequence is modified to reduce outward door movement while continuing to open the door, the modified process continuing as long as no obstacle is detected that is located within the programmed distance (step 1349). In the preferred embodiment, however, the door opening sequence is programmed to maintain the door as close as possible to the vehicle. As such, if an obstacle is detected next to the car and within the programmed distance, the door's opening sequence cannot be modified to reduce outward door movement. Accordingly, in this embodiment door motion is stopped (step 1351) and preferably the warning indicator is activated (step 1353).

Figure 14:
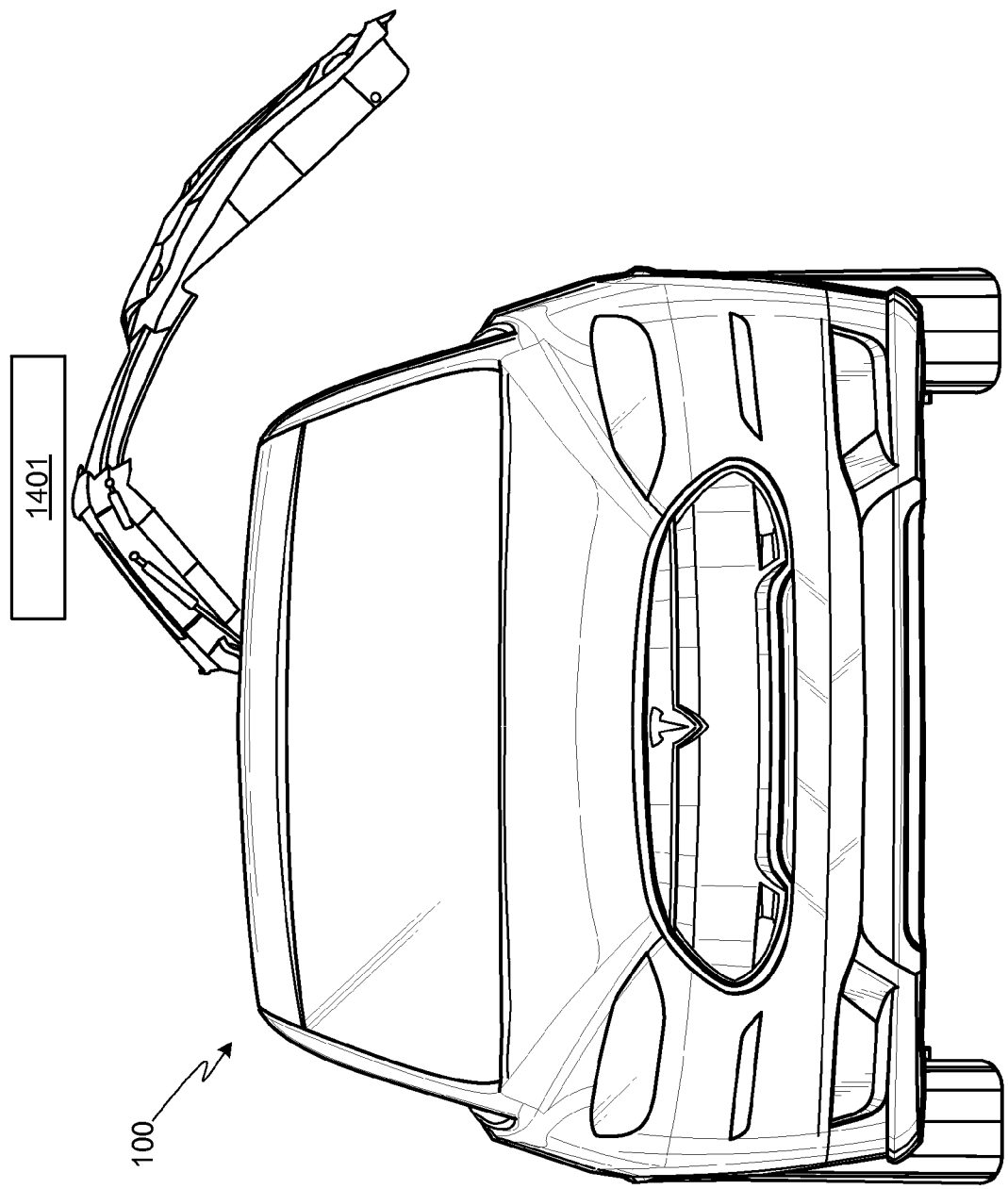
FIG. 14 provides a front view of the vehicle shown in FIG. 1 with the left rear dual hinged door undergoing a modified opening sequence due to an object detected above the vehicle.

In step 1339, if the detected obstacle is above the vehicle (step 1355), for example located in zone 1, or in some embodiments within zones 1 or 2, the controller determines if the obstacle lies within the programmed distance (step 1357), e.g., 2 inches. If the obstacle is outside of this distance, the door continues to open normally (step 1359) while continuing to monitor for obstacles. If the obstacle lies within the programmed distance (step 1361), the door opening sequence is modified to stop movement of the upper door portion about the primary axis while continuing to move the lower door portion outwards about the secondary axis (step 1363). This process continues until either the lower door portion 203 reaches it maximum opening, or until an obstacle is detected within the programmed distance that prevents further movement about the secondary axis. FIG. 14 illustrates the situation in which an obstacle 1401 is detected above the car, causing controller 1201 to modify the opening sequence and stop motion about primary axis 301 while continuing to open the lower door portion 203 about secondary axis 303.

When the door close sequence is initiated (step 1307), controller 1201 checks the proximity sensors 1213 (step 1365) to determine if there is an obstacle that would prevent the door from closing properly. If an obstacle is not detected (step 1367), then the door close sequence is initiated (step 1368). If an obstacle is detected (step 1369), then the distance to the object is determined (step 1371). If the distance from the vehicle to the object is greater than a preset value (step 1373), door movement is initiated (step 1368). If the distance from the vehicle to the object is less than the preset value (step 1375), indicating that the detected object will interfere with door closure, door movement is not initiated and preferably warning indicator 1221 is activated (step 1377).

Once it is determined that there is nothing obstructing the door from closing, controller 1201 determines if the door is in a normal position (step 1379), e.g., the door opening sequence was not modified due to an obstacle. If the door was left in a non-normal open position (step 1381), for example due to an obstacle blocking the normal opening sequence (see, for example, step 1355 above), then preferably the door is first returned to the normal door path (step 1383). This may, for example, require that the lower door portion 203 be rotated inwardly about secondary axis 303 until both door portions are properly positioned relative to the normal door path.

After the normal closing sequence is initiated, controller 1201 continually monitors for objects that would prevent the door from closing normally (step 1385). If an obstacle is detected (step 1387), then the distance of the object is determined (step 1389). If the distance from the vehicle to the object is less than the preset value (step 1390), indicating that the detected object will interfere with door closure, the door closing sequence is terminated (step 1391). In the preferred embodiment, while detection of an obstacle that will prevent door closure by a proximity sensor causes the door closing sequence to terminate (step 1391), if the obstacle is detected by a pinch detector, excess current or reduced speed of the power mechanism (step 1392), controller 1201 also reverses direction of the door motion (step 1393) and preferably activates warning indicator 1221 (step 1394). As long as no obstacles are detected that are close enough to obstruct the door closing sequence (step 1395), the process continues with the controller continually monitoring for potential obstacles, including obstacles indicated by excess pump current, reduced motor speed or an obstacle detected by a pinch detector 1211. This process continues until the controller determines that the door is closed (step 1396), at which point the door closing sequence is terminated (step 1397) and the door is cinched closed (step 1398) with the latch motor 1215. The controller ensures that the door latches are fully engaged using the latch sensors 1207 (step 1399). If the door latches are not fully engaged, preferably controller 1201 activates warning indicator 1221.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A door control system for use with a dual hinged door assembly for a vehicle, comprising:
   a door switch;
   a first door portion hingeably coupled to a structural member within a roof of said vehicle, wherein said first door portion forms part of the roof of said vehicle when said first door portion is in a door closed position, wherein said first door portion is configured to pivot about a primary axis formed by a first juncture of said first door portion and said structural member;
   a second door portion hingeably coupled to said first door portion, wherein said second door portion forms part of a vehicle side when said first door portion and said second door portion are in said door closed position, and wherein said second door portion is configured to pivot about a secondary axis formed by a second juncture of said first door portion and said second door portion;
   a primary door drive system, wherein said first door portion is mechanically coupled to said primary door drive system, wherein said primary door drive system provides powered motion of said first door portion about said primary axis between a door open position and said door closed position;
   a secondary door drive system, wherein said second door portion is mechanically coupled to said secondary door drive system, wherein said secondary door drive system provides powered motion of said second door portion about said secondary axis between said door open position and said door closed position; and
   a controller coupled to said primary and secondary door drive systems and to said door switch, said controller configured to provide independent motion control of said first and second door portions via said primary and secondary door drive systems in response to activation of said door switch.

2. The door control system of claim 1, wherein said controller is configured to determine if activation of said door switch corresponds to a door open command or a door close command.

3. The door control system of claim 2, further comprising a plurality of position sensors coupled to said controller, said plurality of position sensors configured to provide position data for said first door portion and said second door portion to said controller, wherein said controller is configured to utilize said position data in determining whether activation of said door switch corresponds to said door open command or said door close command.

4. The door control system of claim 1, further comprising a plurality of position sensors coupled to said controller, said plurality of position sensors configured to provide position data for said first door portion and said second door portion to said controller, wherein said controller is configured to utilize said position data in providing independent motion control of said first and second door portions via said primary and secondary door drive systems.

5. The door control system of claim 4, wherein upon receipt of a door open command said controller utilizes said position data and said primary and secondary door drive systems to perform a preset door opening sequence of motions with said first and second door portions.

6. The door control system of claim 4, wherein upon receipt of a door close command said controller utilizes said position data and said primary and secondary door drive systems to perform a preset door closing sequence of motions with said first and second door portions.

7. The door control system of claim 1, further comprising a plurality of proximity sensors coupled to said controller, said plurality of proximity sensors configured to provide position data for an obstacle located outside of said vehicle, wherein said controller is configured to determine from said position data whether said obstacle detected by said plurality of proximity sensors will obstruct motion of said first and second door portions during performance of a preset door opening sequence or a preset door closing sequence.

8. The door control system of claim 1, further comprising a plurality of proximity sensors coupled to said controller, wherein said controller is configured to modify a preset door opening sequence if an obstacle is detected by said plurality of proximity sensors that would otherwise interfere with motion of said first and second door portions during performance of said preset door opening sequence, and wherein said controller is configured to modify a preset door closing sequence if said obstacle would otherwise interfere with motion of said first and second door portions during performance of said preset door closing sequence.

9. The door control system of claim 8, further comprising a warning indicator coupled to said controller, wherein said controller is configured to activate said warning indicator whenever said controller modifies either said preset door opening sequence or said preset door closing sequence.

10. The door control system of claim 8, wherein by modifying said preset door opening sequence said first and second door portions follow an alternate motion sequence that includes an alternate pathway for at least one of said first and second door portions.

11. The door control system of claim 8, wherein said plurality of proximity sensors monitor a plurality of zones outside of said vehicle, wherein at least one of said plurality of zones is located above said roof of said vehicle, and wherein at least one of said plurality of zones is located adjacent to said vehicle side.

12. The door control system of claim 1, further comprising at least one door latching mechanism corresponding to said dual hinged door assembly, wherein said at least one door latching mechanism is coupled to said controller, wherein said controller is configured to activate said at least one door latching mechanism to cinch close said dual hinged door assembly after completion of a preset door closing sequence, and wherein said controller is configured to activate said at least one door latching mechanism to release said dual hinged door assembly prior to performance of a preset door opening sequence.

13. The door control system of claim 12, further comprising at least one latch sensor coupled to said controller and coupled to said at least one door latching mechanism, wherein said at least one latch sensor provides latch position data to said controller, said latch position data corresponding to said at least one door latching mechanism in a latch open position or a latch closed position.

14. The door control system of claim 1, wherein said door switch is selected from the group consisting of externally mounted switches, internally mounted switches, and remotely mounted switches.

15. The door control system of claim 14, wherein said externally mounted switch is mounted to a door handle of said dual hinged door assembly, wherein said internally mounted switch is mounted to an interior vehicle surface, and wherein said remotely mounted switch is located on a key fob.

16. The door control system of claim 1, further comprising a plurality of pinch sensors coupled to said controller, wherein said controller is configured to modify a preset door closing sequence if an obstacle is detected by said plurality of pinch sensors that interferes with complete closure of said dual hinged door assembly.

17. The door control system of claim 16, further comprising a warning indicator coupled to said controller, wherein said controller is configured to activate said warning indicator whenever said controller modifies said preset door closing sequence.

18. The door control system of claim 1, wherein said controller is configured to monitor current drawn by said primary door drive system whenever said controller activates said primary door drive system to cause powered motion of said first door portion, wherein said controller is configured to monitor current drawn by said secondary door drive system whenever said controller activates said secondary door drive system to cause powered motion of said second door portion, wherein said controller is configured to modify a preset door opening sequence if said monitored current of either said primary or secondary door drive system exceeds a preset value, and wherein said controller is configured to modify a preset door closing sequence if said monitored current of either said primary or secondary door drive system exceeds said preset value.

19. The door control system of claim 18, further comprising a warning indicator coupled to said controller, wherein said controller is configured to activate said warning indicator whenever said controller modifies either said preset door opening sequence or said preset door closing sequence.

20. The door control system of claim 1, wherein said controller is configured to monitor motor speed corresponding to said primary door drive system whenever said controller activates said primary door drive system to cause powered motion of said first door portion, wherein said controller is configured to monitor motor speed corresponding to said secondary door drive system whenever said controller activates said secondary door drive system to cause powered motion of said second door portion, wherein said controller is configured to modify a preset door opening sequence if said monitored motor speed of either said primary or secondary door drive system falls below a preset value, and wherein said controller is configured to modify a preset door closing sequence if said monitored current of either said primary or secondary door drive system falls below said preset value.

21. The door control system of claim 20, further comprising a warning indicator coupled to said controller, wherein said controller is configured to activate said warning indicator whenever said controller modifies either said preset door opening sequence or said preset door closing sequence.

22. The door control system of claim 1, wherein said primary door drive system is comprised of a primary hydraulic powered strut and a primary non-powered gas strut, and wherein said secondary door drive system is comprised of a secondary hydraulic powered strut and a secondary non-powered gas strut, wherein said door control system further comprises a hydraulic pump and a hydraulic valve system, wherein said hydraulic pump and said hydraulic valve system are coupled to said primary and secondary hydraulic powered struts and to said controller, wherein said controller provides independent motion control of said first and second door portions via said hydraulic pump and said hydraulic valve system.

* * * * *